United States Patent [19]

Holce et al.

[11] 3,846,589

[45] Nov. 5, 1974

[54] TELEPHONE TRUNK SIGNALING LINK CIRCUIT

[75] Inventors: Thomas J. Holce, Portland; Charles M. Huckins, Tigard, both of Oreg.

[73] Assignee: Kentrox Industries, Inc., Portland, Oreg.

[22] Filed: June 2, 1972

[21] Appl. No.: 259,222

[52] U.S. Cl. .............. 179/98, 317/101 C, 339/17 R

[51] Int. Cl. .......................... H04q 1/08, H05k 1/04

[58] Field of Search ......... 179/64, 1 PC, 96, 97, 98; 317/101 CC, 101 C; 339/17 C, 17 LM, 17 M, 17 R, 17 L

[56] References Cited

UNITED STATES PATENTS

| | | | |
|---|---|---|---|
| 876,400 | 1/1908 | Rolfe | 179/98 |
| 3,405,324 | 10/1968 | Alexander et al. | 317/101 CC |
| 3,631,300 | 12/1971 | Humble | 317/101 CC |
| 3,641,475 | 2/1972 | Irish et al. | 339/17 L |
| 3,683,317 | 8/1972 | Walkup | 339/17 C |
| 3,685,002 | 8/1972 | Kennedy | 317/101 CC |

*Primary Examiner*—William C. Cooper

*Attorney, Agent, or Firm*—Oliver D. Olson

[57] ABSTRACT

A telephone E and M trunk signaling link circuit is formed of an integral assembly of a plurality of electrically non-conductive terminal blocks which mount a plurality of electrically conductive terminal elements which detachably support and make electrical contact with a plurality of printed circuit boards to which are connected electrically a plurality of socket members removably mounting a plurality of Darlington amplifiers.

1 Claim, 8 Drawing Figures

TELEPHONE TRUNK SIGNALING LINK CIRCUIT

BACKGROUND OF THE INVENTION

This invention relates to telephone central equipment, and more particularly to a novel E and M trunk signaling link circuit therefor.

E and M trunk signaling link circuits presently in use by telephone companies involve a main frame and associated equipment bays, with a multitude of long, flexible electrical conductors extending from the main frame to electrical components in the equipment bays and then back to the main frame. The equipment bay components are not only costly, but they are also bulky. As a consequence, the equipment bays are large and therefore utilize a substantial amount of floor space. Accordingly, presently used E and M trunk signaling link circuits represent a significant cost factor, both from the standpoint of high cost of components and expensive floor space, and of high cost of labor and materials in wiring.

SUMMARY OF THE INVENTION

In its basic concept, this invention provides an E and M trunk signaling link circuit constructed as an integral unit adapted to be mounted on a main frame and incorporating in the unit the electrical components which are equivalent to those normally contained in equipment bays.

It is by virtue of the foregoing basic concept that the principal objective of this invention is achieved; namely, to overcome the aforementioned disadvantages associated with prior E and M trunk signaling link circuits.

Another important object of this invention is the provision of an E and M trunk signaling link circuit of the class described which is of simplified and compact construction for economical manufacture, resulting in the reduction of floor space requirement by a factor of at least 10, a component cost reduction also by a factor of at least 10 and a corresponding reduction in cost of wiring labor and materials.

The foregoing and other objects and advantages of this invention will appear from the following detailed description, taken in connection with the accompanying drawing of a preferred embodiment.

DESCRIPTION OF THE PREFERRED EMBODIMENT

Figure 2:
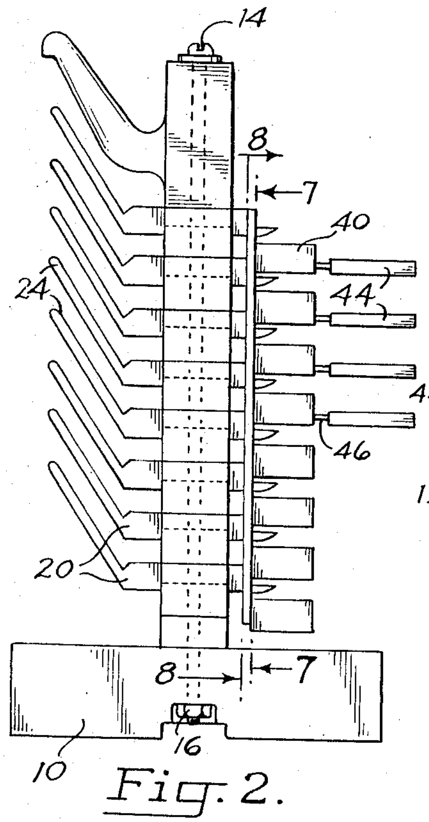
FIG. 2 is an end elevation as viewed from the left in FIG. 1.
Figure 1:
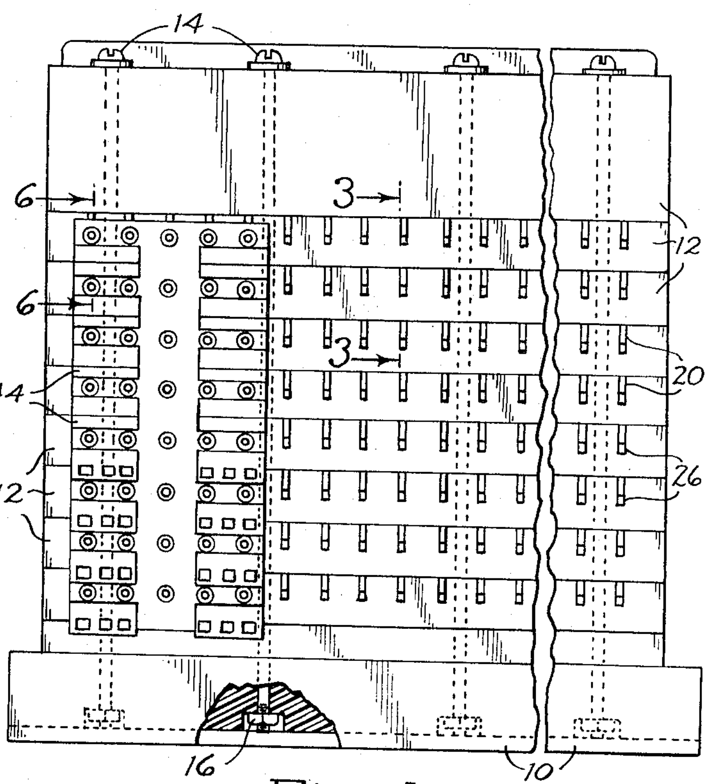
FIG. 1 is a foreshortened view in elevation of an E and M trunk signaling link circuit embodying the features of this invention.

Referring primarily to FIGS. 1 and 2 of the drawing, the E and M trunk signaling link circuit comprises a plurality of components assembled together into an integrated unit adapted for convenient mounting on the main frame of a conventional central system. Thus, a base plate 10 of electrically non-conductive material supports a plurality of terminal support blocks 12 also of electrically non-conductive material. The strips are arranged in a stack, extending perpendicularly from the base plate, and are provided with laterally spaced registering openings for the reception of tie rods 14 which also extend through registering openings in the base plate. An exposed threaded end portion of each rod thus receives a nut 16, by which to secure the stacked blocks and base plate together.

Figure 3:
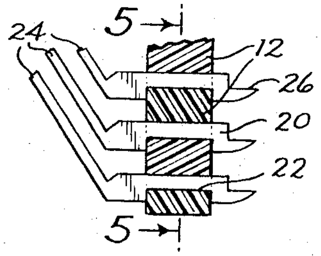
FIG. 3 is a fragmentary sectional view taken on the line 3—3 in FIG. 1.
Figure 4:
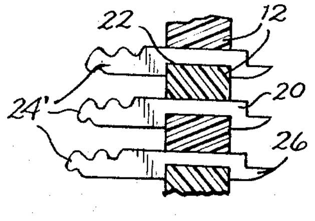
FIG. 4 is a fragmentary sectional view similar to FIG. 3 but showing an alternative form of conductor terminal.
Figure 5:
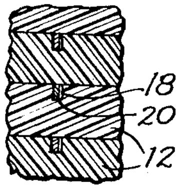
FIG. 5 is a fragmentary sectional view taken on the line 5—5 in FIG. 3.

Each terminal support block is provided with a plurality of laterally spaced notches 18 (FIG. 5) each arranged to receive an electrically conductive terminal 20. As best illustrated in FIGS. 3 and 4, each terminal is provided intermediate its ends with a notch 22 extending upward from its lower side. The length of the notch is dimensioned to correspond to the width of the terminal support block and the depth of the notch is selected to provide the body of the terminal immediately above it with a dimension corresponding to the depth of the notch 22 in the terminal block. Accordingly, when the terminal is positioned within the notch, the upper edge of the terminal lies in the same plane as the upper surface of the block.

The lower surface of each terminal block rests in abutment with the upper surface of the terminal block immediately below it in the stacked assembly. Accordingly, the terminals 20 are secured in position and restrained from displacement.

One end of each electrically conductive terminal 20 is provided with means for the connection of an electrical conductor wire. In FIG. 3 the terminal end portion 24 of each terminal is designed for a wire wrap, as is well known, whereas in FIG. 4 the terminal end portion 24' is designed for a solder connection, also as is well known.

The opposite end of each terminal forms a projecting contact 26 dimensioned for reception through a hole 28 in a printed circuit board 30 (FIGS. 7 and 8) of electrically non-conductive material. The circuit board thus is provided with a plurality of such openings for registration with the corresponding plurality of projecting contacts 26. As is well known, the holes in the printed circuit board are lined with a film 32 of electrically conductive material, such as silver. In accordance with conventional printed circuit technology, such linings are in electrical continuity with appropriately deposited lines 34 of electrically conductive material leading to other holes 36 in the board for the mounting of resistors and still other holes 38 for the mounting of other electrical components.

Figure 6:
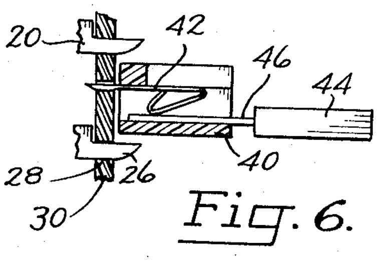
FIG. 6 is a fragmentary sectional view taken on the line 6—6 in FIG. 1.

The holes 38 are lined with electrically conductive material, for reception of the electrically conductive terminal ends of a socket member. As best illustrated in FIG. 6, the socket member comprises a hollow rectangular body 40 of electrically non-conductive material in which is secured three laterally spaced, electrically conductive contacts 42. The end of each contact opposite the projecting male portion is bent back upon itself to form a resilient section which abuts the inner wall of the socket member. The resilient section of each contact thus may deflect resiliently away from said wall upon the insertion into the socket opening of the projecting terminal end portion of an electrical component 44.

In accordance with this invention, such an electrical component is a Darlington amplifier. As is well known, there are three spaced terminals 46 projecting from the amplifier, and these three terminals are inserted removably into the socket member, with each terminal making electrical contact with the resilient section of each of the three contacts 42 of the socket member.

Each Darlington amplifier pair replaces a polarity sensing relay conventionally employed in E and M trunk signaling link circuits and also conventionally contained in the equipment bays.

Figure 7:
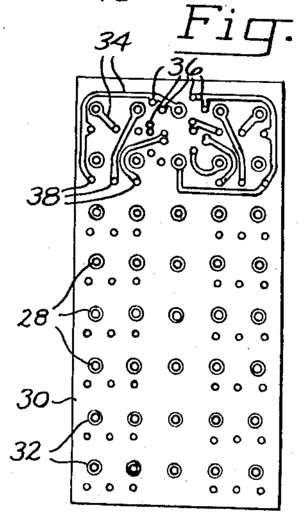
FIG. 7 is a plan view of one side of a printed circuit board incorporated in the circuit of FIG. 1, as viewed in the direction of the arrows 7—7 in FIG. 2.
Figure 8:
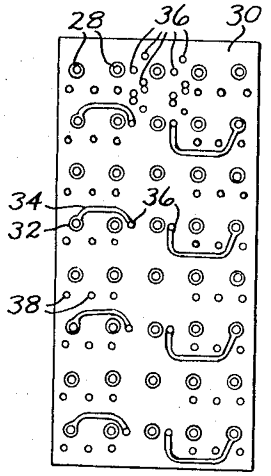
FIG. 8 is a plan view of the opposite side of the printed circuit board as viewed in the direction of the arrows 8—8 in FIG. 2.

In FIG. 7 the upper portion of the printed circuit board is shown in completed form, merely to illustrate typical electrical interconnections between the terminal contact projections 26 in holes 28, socket contacts 42 in holes 38, and appropriate resistors (not shown) mounted in holes 36, to complete the link circuit configuration.

It is to be noted that the terminal support block and terminal assembly supports a plurality of printed circuit boards. This modular arrangement affords the development of a large number of link circuits. For example, in the illustrated arrangement wherein the unit includes 200 terminals in an area of about 24 square inches, it provides the equivalent of 40 conventional DX-1 units.

If desired, the projecting male end portions of the socket members may be secured in the mounting holes 38 in the printed circuit boards, as by soldering. However, the Darlington amplifiers 44 are removable from the socket members, for convenient maintenance.

From the foregoing, it will be appreciated that this invention provides an E and M trunk signaling link circuit of simplified and economical construction and of compact configuration, which is adapted for mounting on the main frame of conventional central equipment and replaces the components in and connections of conventional equipment bays. Because of these features, the circuit of this invention reduces by a factor of at least 10 the floor space and component cost presently involved, and proportionately reduces the cost of wiring labor and materials.

It will be apparent to those skilled in the art that various changes may be made in the size, shape, type, number and arrangement of parts described hereinbefore without departing from the spirit of this invention.

Having now described our invention and the manner in which it may be used, we claim:

1. An electrical connector and component mount assembly providing a telephone E and M trunk signaling link circuit, comprising:

a. a plurality of electrically non-conductive terminal support blocks arranged in a stack and secured together releasably to form a block assembly, b. a plurality of electrically conductive terminals mounted between adjacent blocks in laterally and electrically spaced-apart relationship and projecting from opposite sides of the block assembly, c. one projecting end of each terminal providing a connector for an electrical conductor, d. the opposite projecting end of each terminal providing an electrical contact, e. a printed circuit board having a plurality of openings therethrough arranged for reception of the electrical contacts for supporting the printed circuit board on the contacts, f. a plurality of electrical components supported on the printed circuit board and including a plurality of amplifiers supported removably on the printed circuit board, and g. electrical conductors on the printed circuit board interconnecting predetermined ones of the contact-receiving openings and said electrical components in a telephone E and M trunk signaling link circuit configuration.

* * * * *